US009636966B2

(12) United States Patent
Imazu et al.

(10) Patent No.: US 9,636,966 B2
(45) Date of Patent: May 2, 2017

(54) STABILIZER BUSHING (71) Applicant: TOYO TIRE & RUBBER CO., LTD., Osaka-shi, Osaka (JP)

(72) Inventors: Eiichi Imazu, Osaka (JP); Yoshiyuki Saihara, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 0 days.

(21) Appl. No.: 14/678,185

(22) Filed: Apr. 3, 2015

(65) Prior Publication Data
US 2015/0290997 A1 Oct. 15, 2015

(30) Foreign Application Priority Data
Apr. 11, 2014 (JP) .................................. 2014-081678

(51) Int. Cl.
*B60G 21/055* (2006.01)
*F16F 1/16* (2006.01)

(52) U.S. Cl.
CPC ............ *B60G 21/0551* (2013.01); *F16F 1/16* (2013.01); *B60G 2202/135* (2013.01); *B60G 2204/1222* (2013.01); *B60G 2204/41* (2013.01)

(58) Field of Classification Search
CPC .. B60G 21/055; B60G 21/0551; B60G 11/24; B60G 2022/135; B60G 2204/1222; B60G 2204/41; F16F 1/38; F16F 1/16
USPC ......... 267/293, 189, 276, 141.1; 280/124.13, 280/124.77, 124.107
See application file for complete search history.

(56) References Cited

U.S. PATENT DOCUMENTS

| 3,464,656 A * | 9/1969 | Boden ....................... F16F 1/38 |
| | | 16/109 |
| 6,513,801 B1 * | 2/2003 | McCarthy .......... B60G 21/0551 |
| | | 267/141.1 |
| 2006/0091595 A1 | 5/2006 | Hayashi et al. |

(Continued)

FOREIGN PATENT DOCUMENTS

| CN | 1766362 A | 5/2006 |
| CN | 1875204 A | 12/2006 |

(Continued)

OTHER PUBLICATIONS

Office Action dated Nov. 2, 2016, issued in Chinese Patent Application No. 201510162175.7 with English Translation (15 pages).

*Primary Examiner* — Melanie Torres Williams
(74) *Attorney, Agent, or Firm* — Westerman, Hattori, Daniels & Adrian, LLP (57) ABSTRACT

When a clipping member is fitted onto the outer peripheral surface of a sealing member, the tightening margin for elastic fitting is provided to the sealing member by the fastening force of the clipping member. In this case, the clipping member includes an opening portion formed to have a partial separation in the circumferential direction and is formed from a metallic material approximately in a C shape having an inner diameter smaller than the outer diameter of the sealing member. Also in the case where a permanent set occurs in the rubber elastic body (the sealing member) as time passes, the clipping member is reduced in diameter by the elastic restoring force of itself. Accordingly, the tightening margin for elastic fitting to the stabilizer bar can be continuously provided to the sealing member.

14 Claims, 6 Drawing Sheets

(56) References Cited

U.S. PATENT DOCUMENTS

2006/0125165 A1    6/2006  Niwa et al.
2007/0194549 A1*  8/2007  Germano ........... B60G 21/0551
                                                            280/124.107

FOREIGN PATENT DOCUMENTS

JP         2006-69234 A    3/2006
JP        2012-197056 A   10/2012

* cited by examiner

STABILIZER BUSHING

TECHNICAL FIELD

The present invention relates to a stabilizer bushing, particularly, relates to a stabilizer bushing that ensures a tightening margin for elastic fitting to a stabilizer bar even in the case where a permanent set occur in a rubber elastic body.

BACKGROUND ART

A stabilizer bushing is formed in a tubular shape from a rubber elastic body, and is fitted onto a stabilizer bar so as to elastically support the stabilizer bar on a vehicle body. In this case, when the right and left wheels are displaced in opposite phases in the up-down direction, the force in the twisting direction from the stabilizer bar acts on the stabilizer bushing. Thus, a gap is formed between the outer peripheral surface of the stabilizer bar and the inner peripheral surface of the stabilizer bushing. When the foreign material gets into this gap, deterioration in slidability and abnormal noise due to the foreign material are caused.

Therefore, in Patent Literature 1 discloses the technology that bonds the outer peripheral surface of the stabilizer bar and the inner peripheral surface of the rubber bushing (the stabilizer bushing) to each other with a thermosetting adhesive, so as to inhibit the foreign material from getting into between the inner and outer peripheral surfaces of these members.

However, in the technology of Patent Literature 1, the man-hour cost of application and drying of the adhesive is increased and the facility becomes a large size. Thus, the production efficiency is poor and the product cost is correspondingly increased. In contrast, Patent Literature 2 discloses the technology where a sealing lip projects from the axial end surface of a stabilizer bushing and this sealing lip is elastically fitted to the outer peripheral surface of a stabilizer bar with a predetermined tightening margin, so as to inhibit the foreign material from getting into between the inner and outer peripheral surfaces of these members.

CITATION LIST

Patent Literature

[Patent Literature 1] JP-A No. 2006-69234 (for example, paragraph 0008, the third drawing, and similar part)
[Patent Literature 2] JP-A No. 2012-197056 (for example, paragraph 0018, the sixth drawing, and similar part)

SUMMARY OF INVENTION

Technical Problem

However, the technology of Patent Literature 2 described above has the configuration where the tightening margin for elastic fitting is provided only by the elastic force of the sealing lip formed from the rubber elastic body. Accordingly, there is a problem that, when a permanent set occurs in the rubber elastic body as time passes, the tightening margin for elastic fitting to the stabilizer bar is reduced.

Here, in the technology in Patent Literature 1 described above, at the time of the bonding process using the adhesive, tightening bands are wound around rubber ring portions disposed on both outer sides of the rubber bushing in the axial direction. Accordingly, the inner peripheral surface (particularly, both the outer sides in the axial direction) of the rubber bushing is easily in contact with the outer peripheral surface of the stabilizer bar. This reduces the occurrence of bonding failure.

Here, these tightening band and rubber ring portion are portions separated and removed after the bonding process (paragraph 0021 and the fourth drawing in Patent Literature 2). If these tightening band and the rubber ring portion are used to attempt to inhibit the foreign material from getting into between the outer peripheral surface of the stabilizer bar and the inner peripheral surface of the stabilizer bushing, a permanent set occurring in the rubber elastic body (the rubber ring portion) as time passes correspondingly reduces the tightening margin due to a constant inner diameter of the tightening band.

The present invention has been made to address the above-described problem, and it is an object of the present invention to provide a stabilizer bushing that ensures a tightening margin for elastic fitting to a stabilizer bar also in the case where a permanent set occurs in a rubber elastic body.

Solution to Problem and Advantageous Effects of Invention

With the stabilizer bushing according to the present invention, when the clipping member is fitted onto the outer peripheral surface of the sealing member, the tightening margin for elastic fitting is provided to the sealing member by the fastening force of the clipping member. As a result, the inner peripheral surface of the sealing member makes contact with the outer peripheral surface of the stabilizer bar. This inhibits the foreign material from getting into between the outer peripheral surface of the stabilizer bar and the inner peripheral surface of the main body member.

In this case, the clipping member includes the opening portion formed to be partially separated in the circumferential direction and is formed from a metallic material to have an approximately C shape whose inner diameter is smaller than the outer diameter of the sealing member. Accordingly, also in the case where a permanent set occurs in the rubber elastic body (sealing member) as time passes, the clipping member is reduced in diameter by the elastic restoring force of itself. Accordingly, the tightening margin for elastic fitting to the stabilizer bar can be continuously provided to the sealing member.

With the stabilizer bushing according to the present invention, in addition to the effects provided by the stabilizer bushing described above, the sealing member includes the communication-portion depressed groove that is depressed on the outer peripheral surface of the communication portion with the main body member and is disposed to extend in the circumferential direction. This ensures a small thickness of the communication portion between the sealing member and the main body member by the depression of the communication-portion depressed groove. This allows the sealing member to be independent from the main body member (that is, reducing the influence on the sealing member from the main body member) so as to allow the sealing member to easily follow the movement of the stabilizer bar.

With the stabilizer bushing according to the present invention, in addition to the effect provided by the stabilizer bushing described above, the communication-portion depressed groove is formed to have a circular shape in cross-sectional view at a groove bottom side so as to have an expanded groove width. Accordingly, the stress concentration can be reduced by the stress relaxation effect so as to reduce the occurrence of crack at the groove bottom side of the communication-portion depressed groove.

With the stabilizer bushing according to the present invention, in addition to the effect provided by the stabilizer bushing described above, the sealing member includes the externally-fitted depressed groove that is depressed on the outer peripheral surface of the sealing member and disposed to extend along the circumferential direction so as to externally fit the clipping member. Accordingly, the displacement of the clipping member can be restricted by the inner wall of the externally-fitted depressed groove so as to inhibit the clipping member from dropping off.

In particular, according to the present invention, when the clipping member is fitted onto the externally-fitted depressed groove, the inner wall of the externally-fitted depressed groove falls inward (is interfolded) by the fastening force of the clipping member. Accordingly, it is possible to restrict not only the displacement to the axial direction of the clipping member but also the displacement to the radially outer side of the clipping member by the inner wall after falling inward.

With the stabilizer bushing according to the present invention, in addition to the effect provided by the stabilizer bushing described above, the externally-fitted depressed groove of the sealing member is formed such that at least a part of the inner wall of the externally-fitted depressed groove projects inward. Accordingly, providing the fastening force by externally fitting the clipping member to the externally-fitted depressed groove allows the inner wall of the externally-fitted depressed groove to further fall over so as to ensure the overlap margin with the clipping member. As a result, the displacement to the radially outer side of the clipping member can be more reliably restricted.

With the stabilizer bushing according to the present invention, in addition to the effect provided by the stabilizer bushing described above, the projection distal end projects inward from the inner wall of the externally-fitted depressed groove, and the projection distal end has the overlap margin with the clipping member in the state where the fastening force of the clipping member does not act. This ensures the overlap margin between: the projection distal end projecting inward from the inner wall of the externally-fitted depressed groove, and the clipping member. As a result, the displacement to the radially outer side of the clipping member can be more reliably restricted.

With the stabilizer bushing according to the present invention, in addition to the stabilizer bushing described above, the inner wall of the externally-fitted depressed groove of the sealing member includes the projecting inner wall formed such that the predetermined range having the position differing from the slit portion in phase by 180 degrees partially projects inward. When the slit portion of the main body member and the sealing member and the opening portion of the clipping member are opened to externally fit the main body member and the sealing member to the stabilizer bar in the state where the clipping member is fitted onto the sealing member, the projecting inner wall restricts ejection of the clipping member toward the opposite side to the opening portion (slit portion) so as to inhibits the clipping member from dropping off.

On the other hand, the projecting inner wall is partially formed in the predetermined range. Accordingly, compared with the case where the projecting inner wall is formed over the whole circumference, the hindrance to the work for externally fitting the clipping member to the externally-fitted depressed groove of the sealing member by the projecting inner wall can be reduced so as to improve the work efficiency.

With the stabilizer bushing according to the present invention, in addition to the effect provided by the stabilizer bushing described above, the externally-fitted depressed groove of the sealing member includes the positioning portion positioning the opening portion of the clipping member in a position having a phase identical to a phase of the slit portion of the sealing member. In the state where the clipping member is fitted onto the externally-fitted depressed groove of the sealing member, the phases of the slit portion of the sealing member and the opening portion of the clipping member can be matched together.

Accordingly, when the slit portion of the main body member and the sealing member and the opening portion of the clipping member are opened to externally fit the main body member and the sealing member to the stabilizer bar, it is not necessary to match the position of the opening portion of the clipping member to the slit portion. The work efficiency can be correspondingly improved.

In the usage state mounted on a vehicle, engagement of the positioning portion with the opening portion of the clipping member restricts the rotation of the clipping member in the circumferential direction. That is, the circumferential position of the opening portion of the clipping member can be maintained in the position where the force in the twisting direction from the stabilizer bar is less likely to act. This inhibits the clipping member from dropping off from the sealing member when the opening portion of the clipping member is opened by the force in the twisting direction acting from the stabilizer bar.

With the stabilizer bushing according to the present invention, in addition to the effect provided by the stabilizer bushing described above, the clipping member includes the pair of folded-back portions formed such that the opening portion is folded back toward the radially outer side, and the positioning portion is disposed to protrude toward the radially outer side from the bottom surface of the externally-fitted depressed groove and is set to have a dimension smaller than the facing distance between both the folded-back portions. When the slit portion of the stabilizer bushing is opened, and when the clipping member is displaced in the circumferential direction in the usage state where the stabilizer bushing is mounted on the vehicle, the flat surface of the folded-back portion can be abutted on the positioning portion. Accordingly, when the clipping member is displaced in the circumferential direction, the folded-back portion can ensure the area abutting on the positioning portion. This causes dispersion of the stress of the clipping member acting on the positioning portion. This reduces the stress concentration on a part of the positioning portion, thus reducing the occurrence of crack in the positioning portion.

With the stabilizer bushing according to the present invention, in addition to the effect provided by the stabilizer bushing described above, the clearance is formed in a portion where the positioning portion and the folded-back portion of the clipping member face one another. This ensures the deformation amount when the clipping member deforms in the fastening direction. This facilitates deformation of the clipping member in the fastening direction.

With the stabilizer bushing according to the present invention, in addition to the effect provided by the stabilizer bushing described above, the clipping member is formed from the flat plate body that has a horizontally long rectangular shape in cross-sectional view. This reduces a locally biased fastening force provided from the clipping member to the sealing member, so as to improve the durability of the sealing member.

With the stabilizer bushing according to the present invention, in addition to the effect provided by the stabilizer bushing described above, the clipping member is formed from the flat plate body that has a horizontally long rectangular shape in cross-sectional view. This reduces a locally biased fastening force provided from the clipping member to the sealing member, so as to improve the durability of the sealing member.

With the stabilizer bushing according to the present invention, in addition to the effect provided by the stabilizer bushing described above, the clipping member is formed from the linear body that has a circular shape in cross-sectional view. This easily causes the sealing member to follow the movement of the stabilizer bar only in the constraint region where the sealing member is constrained by the clipping member.

With the stabilizer bushing according to the present invention, in addition to the effect provided by the stabilizer bushing described above, the clipping member is formed from the linear body that has a circular shape in cross-sectional view. This easily causes the sealing member to follow the movement of the stabilizer bar only in the constraint region where the sealing member is constrained by the clipping member.

With the stabilizer bushing according the present invention, in addition to the effect provided by the stabilizer bushing described above, a plurality of the clipping members are separated from one another by the predetermined distance in the axial direction of the sealing member and are fitted onto the outer peripheral surface of the sealing member. This ensures the compatibility between: the effect that easily causes the sealing member to follow the movement of the stabilizer bar; and the effect that reduces the entrance of the foreign material.

With the stabilizer bushing according to the present invention, in addition to the effect provided by the stabilizer bushing described above, a plurality of the clipping members are separated from one another by the predetermined distance in the axial direction of the sealing member and are fitted onto the outer peripheral surface of the sealing member. This ensures the compatibility between: the effect that easily causes the sealing member to follow the movement of the stabilizer bar; and the effect that reduces the entrance of the foreign material.

With the stabilizer bushing according to the present invention, in addition to the effect provided by the stabilizer bushing described above, the sealing member includes the protruding portion that is disposed to protrude toward the radially outer side from the outer peripheral surface of the sealing member and intervenes between a plurality of the clipping members. The sidewall of the protruding portion restricts not only the displacement of the clipping member in the axial direction but also the displacement in the radial direction. This consequently inhibits the clipping member from dropping off from the sealing member.

Here, "the outer peripheral surface of the sealing member" according to the present invention corresponds to "the bottom wall of the externally-fitted depressed groove." That is, the protruding portion is disposed to protrude from the bottom wall of the externally-fitted depressed groove.

With the stabilizer bushing according to the present invention, in addition to the effect provided by the stabilizer bushing described above, the protruding portion is formed such that at least a part of the sidewall of the protruding portion projects outward. External fitting of the clipping member to the externally-fitted depressed groove to provide the fastening force causes the sidewall of the protruding portion to fall outward, so as to ensure the overlap margin with the clipping member. As a result, this more reliably restricts the displacement of the clipping member toward the radially outer side.

With the stabilizer bushing according to the present invention, in addition to the effect provided by the stabilizer bushing described above, the clipping member includes the wound portion and the auxiliary portion. The wound portion includes the opening portion and is fitted onto the outer peripheral surface of the sealing member. The wound portion has a separated portion differing from the opening portion in phase by 180 degrees. The auxiliary portion is extended from the separated portion of the wound portion toward the radially outer side of the wound portion, and is formed approximately in a ring shape. Accordingly, when the slit portion of the main body member and the sealing member and the opening portion of the clipping member are opened so as to externally fit the main body member and the sealing member to the stabilizer bar, the auxiliary portion facilitates the deformation of the clipping member. This facilitates the work for opening the opening portion of the clipping member so as to improve the work efficiency for mounting on the stabilizer bar. This reduces the situation where, when the opening portion of the clipping member is opened, the deformation of the clipping member becomes less likely to reach the plastic region and the specified fastening force cannot be provided.

With the stabilizer bushing according to the present invention, in addition to the effect provided by the stabilizer bushing described above, the clipping member includes the wound portion and the auxiliary portion. The wound portion includes the opening portion and is fitted onto the outer peripheral surface of the sealing member. The wound portion has a separated portion differing from the opening portion in phase by 180 degrees. The auxiliary portion is extended from the separated portion of the wound portion toward the radially outer side of the wound portion, and is formed approximately in a ring shape. Accordingly, when the slit portion of the main body member and the sealing member and the opening portion of the clipping member are opened so as to externally fit the main body member and the sealing member to the stabilizer bar, the auxiliary portion facilitates the deformation of the clipping member. This facilitates the work for opening the opening portion of the clipping member so as to improve the work efficiency for mounting on the stabilizer bar. This reduces the situation where, when the opening portion of the clipping member is opened, the deformation of the clipping member becomes less likely to reach the plastic region and the specified fastening force cannot be provided.

DESCRIPTION OF EMBODIMENTS

Figure 1A:
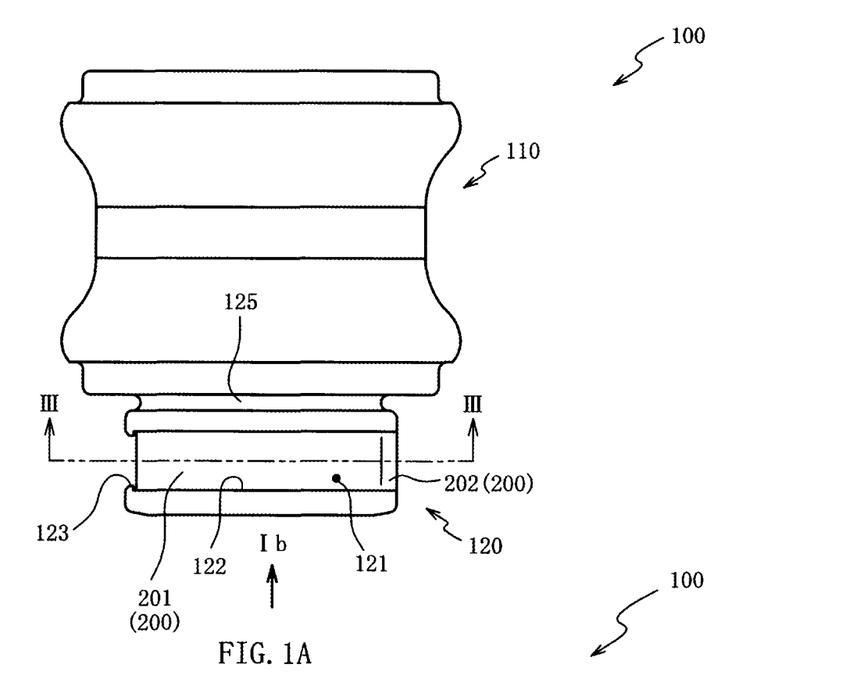
FIG. 1(a) is a top view of a stabilizer bushing according to a first embodiment of the present invention.
Figure 1B:
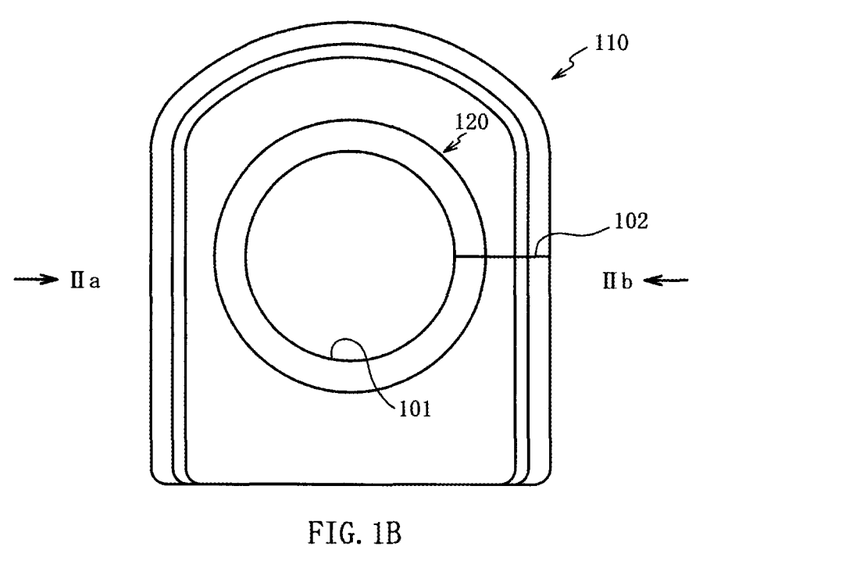
FIG. 1(b) is a front view of the stabilizer bushing in a view from an arrow Ib direction of FIG. 1(a).
Figure 2A:
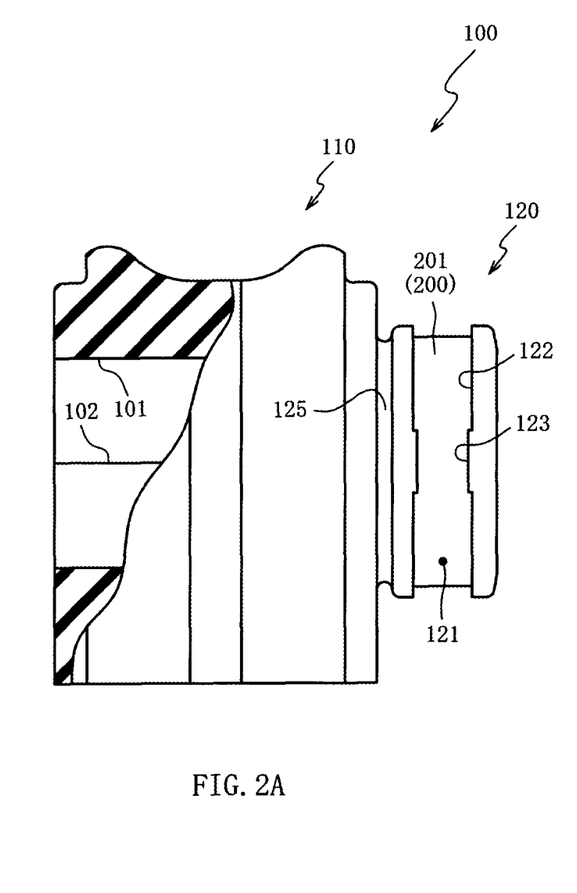
FIG. 2(a) is a side view of the stabilizer bushing in a view from an arrow IIa direction of FIG. 1(b)
Figure 2B:
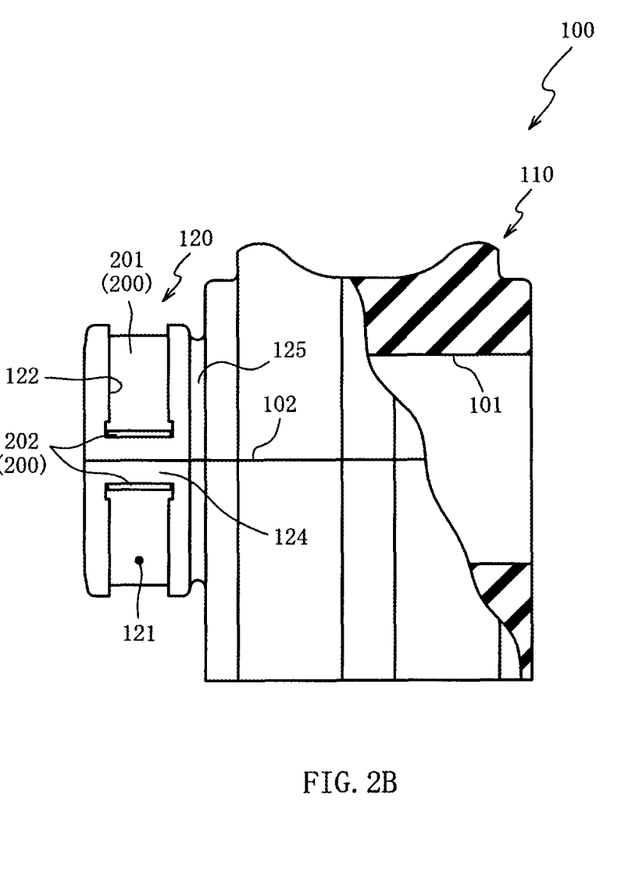
FIG. 2(b) is a side view of the stabilizer bushing in a view from an arrow IIb direction of FIG. 1(b).

Preferred embodiments of the present invention will be described in detail below referring to the accompanying drawings. FIG. 1(a) is a top view of a stabilizer bushing 100 according to a first embodiment of the present invention. FIG. 1(b) is a front view of the stabilizer bushing 100 in a view from an arrow Ib direction of FIG. 1(a). FIG. 2(a) is a side view of the stabilizer bushing 100 in a view from an arrow IIa direction of FIG. 1(b). FIG. 2(b) is a side view of the stabilizer bushing 100 in a view from an arrow IIb direction of FIG. 1(b).

Here, in FIG. 2(a) and FIG. 2(b), a part of the stabilizer bushing 100 is illustrated in partial cross-sectional view. In the following description, the concept of the up and down directions is used. However, the up and down directions in this description are used for describing the shape of the stabilizer bushing 100 for convenience and are reversed with respect to the up and down directions in the vehicle.

As illustrated in FIG. 1 and FIG. 2, the stabilizer bushing 100 is a member formed in a tubular shape having a holding hole 101 from a rubber elastic body. A slit portion 102, which is formed to separate a part of this cylindrical body in the circumferential direction, is opened to allow passage of a stabilizer bar (not illustrated) up to the holding hole 101, so as to externally fit the stabilizer bushing 100 to this stabilizer bar.

For details, the stabilizer bushing 100 includes: a tubular main body member 110; a tubular sealing member 120 integrally disposed in communication with the axial end surface (on the lower surface in FIG. 1(a)) of the main body member 110; and a metallic clipping member 200 fitted onto the sealing member 120. The holding hole 101 is formed to pass through the main body member 110 and the sealing member 120. The slit portion 102 is formed over the entire length of the main body member 110 and the sealing member 120 in the axial direction (the right-left direction in FIG. 2(b)).

On the outer peripheral surface excluding the inferior surface (the lower surface in FIG. 1(b)) of the main body member 110, a recess having an arc shape in cross-sectional view is depressed. This recess is formed to match the shape of the inner peripheral surface of a bracket metal fitting (mounting member). The outer peripheral surface of the main body member 110 is held by the bracket metal fitting mounted on a vehicle body, so as to secure the stabilizer bushing 100 to the vehicle body.

The sealing member 120 is formed in a cylindrical shape concentrically with the holding hole 101 and the clipping member 200 has an inner diameter smaller than the outer diameter of the sealing member 120 so as to provide a predetermined tightening margin to the sealing member 120 by a radially inward fastening force. Here, referring to FIG. 3 and FIG. 4, the detailed configurations of the sealing member 120 and the clipping member 200 will be described.

Figure 3:
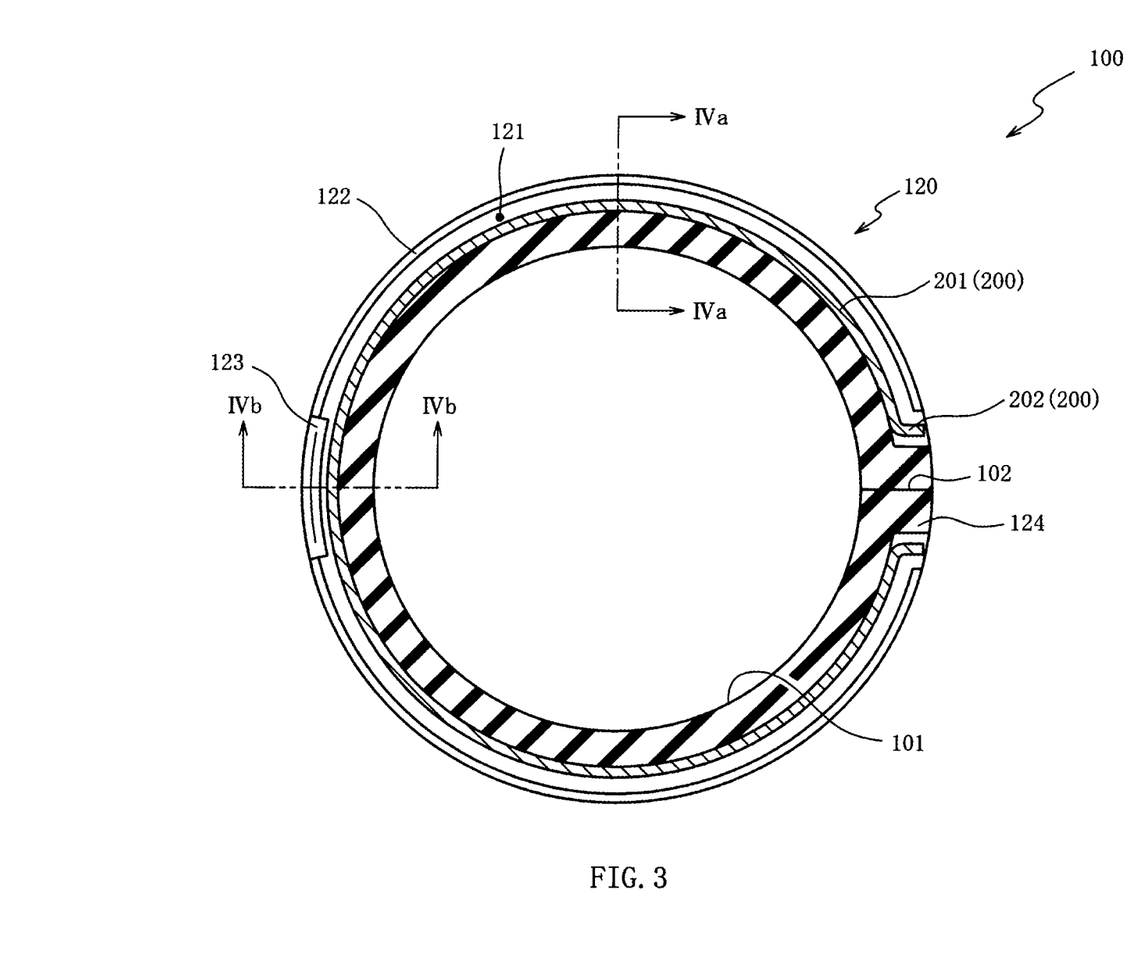
FIG. 3 is a partially enlarged cross-sectional view of the stabilizer bushing taken along the line III-III in FIG. 1(a).
Figure 4A:
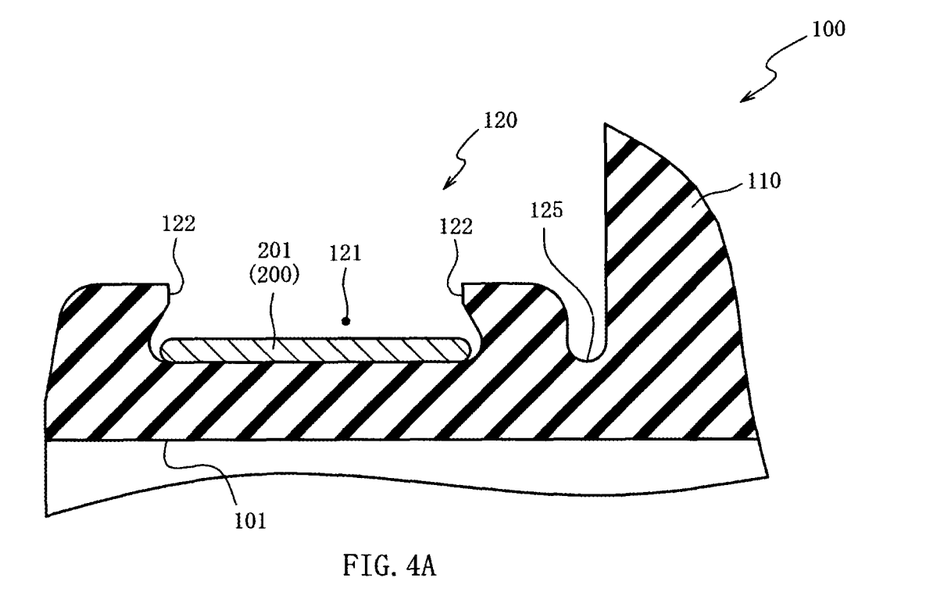
FIG. 4(a) is a partially enlarged cross-sectional view of the stabilizer bushing taken along the line IVa-IVa in FIG. 3.
Figure 4B:
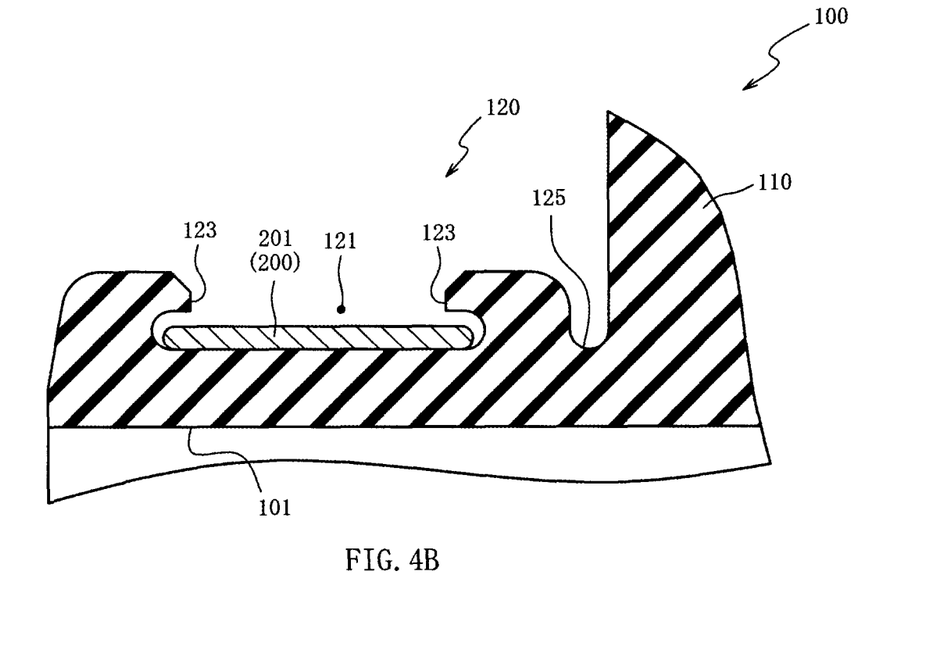
FIG. 4(b) is a partially enlarged cross-sectional view of the stabilizer bushing taken along the line IVb-IVb in FIG. 3.

FIG. 3 is a partially enlarged cross-sectional view of the stabilizer bushing 100 taken along the line III-III in FIG. 1(a). FIG. 4(a) is a partially enlarged cross-sectional view of the stabilizer bushing 100 taken along the line IVa-IVa in FIG. 3. FIG. 4(b) is a partially enlarged cross-sectional view of the stabilizer bushing 100 taken along the line IVb-IVb in FIG. 3.

In FIG. 3, the illustration of the main body member 110 is omitted. FIG. 3 and FIG. 4 illustrate the state where the fastening force of the clipping member 200 does not act on the sealing member 120 (the state where the sealing member 120 is not deformed and the clipping member 200 is elastically deformed in a diameter expanding direction compared with the initial shape).

As illustrated in FIG. 3 and FIG. 4, the sealing member 120 mainly includes: a externally-fitted depressed groove 121 depressed on the outer peripheral surface; a first projecting inner wall 122 and a second projecting inner wall 123 that are formed on the inner wall of the externally-fitted depressed groove 121; a positioning portion 124 that partitions the externally-fitted depressed groove 121 in the circumferential direction; and a communication-portion depressed groove 125 depressed at the main body member 110 side.

The externally-fitted depressed groove 121 is a depressed groove depressed on the outer peripheral surface of the sealing member 120, and is continuously formed along the circumferential direction. The width dimension (the dimension in the right-left direction in FIG. 4(a)) of the externally-fitted depressed groove 121 is set to be larger than the width dimension (the dimension in the right-left direction in FIG. 4(a)) of the clipping member 200. The clipping member 200 is set to be externally fittable to the bottom wall of the externally-fitted depressed groove 121. Here, the bottom wall is formed as a cylindrical surface concentrically with the holding hole 101.

The first projecting inner wall 122 and the second projecting inner wall 123 are portions formed to project inwardly from the mutually facing inner walls of the externally-fitted depressed groove 121. The inward projecting amount (see FIG. 4(a)) of the second projecting inner wall 123 is set to be larger than the inward projecting amount (see FIG. 4(b)) of the first projecting inner wall 122.

The second projecting inner wall 123 is partially formed over a predetermined range (in this embodiment, the range having the center angle of approximately 15 degrees around the axis of the holding hole 101 in FIG. 3) including the position differing from the slit portion 102 in phase by 180 degrees. The first projecting inner wall 122 is continuously formed in the circumferential direction over the range where one end is coupled to the second projecting inner wall 123 and the other end has a slight clearance (the clearance that allows arranging a folded-back portion 202 of the clipping member 200) with the positioning portion 124.

The first projecting inner wall 122 and the second projecting inner wall 123 are formed at the opening side (the opposite side of the bottom wall, the upper side in FIG. 4(a) and FIG. 4(b)) of the externally-fitted depressed groove 121. In this embodiment, in the state where the fastening force of the clipping member 200 does not act, the projection distal ends of the first projecting inner wall 122 and the second projecting inner wall 123 have the overlap margins with the clipping member 200 in the axial direction (the right-left direction in FIG. 4(a) and FIG. 4(b)).

Accordingly, the first projecting inner wall 122 and the second projecting inner wall 123 can restrict displacement of the clipping member 200 fitted onto the externally-fitted depressed groove 121 toward the radially outer side (in the upward direction in FIG. 4(*a*) and FIG. 4(*b*)). This inhibits the clipping member 200 from dropping off from the sealing member 120. On the other hand, the second projecting inner wall 123 with a large inward projecting amount is partially formed only in a part. This improves the work efficiency when the clipping member 200 is fitted onto the externally-fitted depressed groove 121.

In this case, when the clipping member 200 is fitted onto the externally-fitted depressed groove 121, the inner wall of the externally-fitted depressed groove 121 can fall inward (be interfolded) by the fastening force in the radially inner side (the downward direction in FIG. 4(*a*) and FIG. 4(*b*)) of the clipping member 200. Therefore, corresponding to the amount of the inner wall falling inward, the overlap margin is expanded so as to more reliably restrict the displacement (dropping off from the sealing member 120) toward the radially outer side of the clipping member 200. Before the clipping member 200 is externally fitted, the interval (the interval in the right-left direction in FIG. 4(*a*) and FIG. 4(*b*)) between the inner walls is set to be wide. Accordingly, from this point, the work efficiency when the clipping member 200 is fitted onto the externally-fitted depressed groove 121 can be improved.

In particular, the clipping member 200 is formed approximately in a C shape having an opening portion. Accordingly, in the case where a permanent set occurs in the rubber elastic body (the sealing member 120) as time passes, the clipping member 200 is reduced in diameter by its own elastic restoring force so as to continuously provide the fastening force toward the radially inner side. That is, as a more permanent set occurs in the rubber elastic body, the elastic force of the inner wall weakens and the displacement of the clipping member 200 toward the radially outer side cannot be restricted. On the other hand, as a more permanent set occurs in the rubber elastic body, the clipping member 200 can be reduced in diameter so as to allow the inner wall to fall inward. As a result, this easily inhibits the clipping member 200 from dropping off from the sealing member 120.

The second projecting inner wall 123 with the large inward projecting amount is arranged in the position (on the left side in FIG. 3) differing from the slit portion 102 in phase by 180 degrees. Accordingly, the second projecting inner wall 123 can restrict ejection of the clipping member 200 in the opposite direction (leftward in FIG. 3) of the slit portion 102 when the slit portion 102 is opened from the state (the state in FIG. 3) where the clipping member 200 is fitted onto the sealing member 120 to allow passage of the stabilizer bar (not illustrated) up to the holding hole 101. As a result, this inhibits the clipping member 200 from dropping off when the stabilizer bushing 100 is fitted onto the stabilizer bar.

The positioning portion 124 is disposed to protrude toward the radially outer side (rightward in FIG. 3) from the bottom wall of the externally-fitted depressed groove 121, and is separated by the slit portion 102. This positioning portion 124 engages with the opening portion of the clipping member 200. Accordingly, when the slit portion 102 is opened to allow passage of the stabilizer bar (not illustrated) to the holding hole 101, the operation for opening the slit portion 102 also causes simultaneously opening the opening portion of the clipping member 200.

The thickness dimension (the top-to-bottom dimension in FIG. 3) of the positioning portion 124 is set to a dimension smaller than the facing distance (the vertical dimension in FIG. 3) of the folded-back portion 202 in the initial shape of the clipping member 200, so as to be engageable with the opening portion (the portion facing the folded-back portion 202) of the clipping member 200.

Accordingly, the positioning portion 124 allows positioning the opening portion of the clipping member 200 in the position having the phase identical to that of the slit portion 102. Since the clearance is formed in a portion where the positioning portion 124 and the folded-back portion 202 of the clipping member 200 face each other, the clipping member 200 is likely to deform in the fastening direction (the diameter reducing direction).

The communication-portion depressed groove 125 is a depressed groove having a U shape in cross-sectional view and is disposed to extend over the whole circumference in the circumferential direction, and is depressed on the outer peripheral surface of the communication portion with the main body member 110. In this embodiment, the forming position of the communication-portion depressed groove 125 is set to the position where the inner wall at one side (the right side in FIG. 4(*a*) and FIG. 4(*b*)) flatly continues into the axial end surface of the main body member 110.

As just described, depressing the communication-portion depressed groove 125 in the communication portion with the main body member 110 causes a partially small (thin) thickness dimension (the vertical dimension in FIG. 4(*a*) and FIG. 4(*b*)) of the sealing member 120. This inhibits the foreign material from getting into between the inner peripheral surface of the sealing member 120 and the outer peripheral surface of the stabilizer bar.

That is, the outer peripheral surface of the main body member 110 is held by a bracket metal fitting (not illustrated) so as to constrain displacement of the main body member 110. On the other hand, the sealing member 120 can be independent from the main body member 110 (that is, the sealing member 120 can become less likely to be affected by the main body member 110) such that the sealing member 120 can easily follow the movement of the stabilizer bar (not illustrated). Accordingly, also in the case where the force from the stabilizer bar in the twisting direction acts, the clearance is less likely to be formed between the inner peripheral surface of the sealing member 120 and the outer peripheral surface of the stabilizer bar. As a result, this reduces the entrance of the foreign material.

The clipping member 200 is formed from a metallic material, and is a member formed approximately in a C shape by rolling a flat-plate strip-shaped body having a horizontally long rectangular shape in cross-sectional view along the longitudinal direction of the flat-plate strip-shaped body into a ring shape and by separating a part of the ring shape in the circumferential direction so as to form an opening portion. The clipping member 200 includes a wound portion 201 and the folded-back portion 202.

The wound portion 201 is a portion whose part excluding the opening portion is formed in a circular shape in a view of the axial direction, and the inner diameter dimension of the wound portion 201 is set to be a dimension (small diameter) smaller than the outer diameter dimension of the sealing member 120 in the bottom wall of the externally-fitted depressed groove 121. Accordingly, the clipping member 200 (the wound portion 201) can be fitted onto the outer peripheral surface of the sealing member 120 (the bottom wall of the externally-fitted depressed groove 121) to provide the fastening force to the sealing member 120, so as to elastically fit the inner peripheral surface of the sealing member 120 to the outer peripheral surface of the stabilizer bar (not illustrated) (in close contact by a predetermined tightening margin).

The folded-back portion 202 is a portion formed by folding the separated portion (the opening portion) of the wound portion 201 back toward the radially outer side (rightward in FIG. 3), and is formed in pairs parallel to each other. Accordingly, when the slit portion 102 is opened, and when the clipping member 200 is displaced in the circumferential direction in the usage state mounted on a vehicle, the flat surface of the folded-back portion 202 can be abutted on the positioning portion 124 so as to reduce the occurrence of crack in this positioning portion 124.

Next, a description will be given of a method for elastically supporting the stabilizer bar (not illustrated) on the vehicle body by the stabilizer bushing 100. Regarding the stabilizer bushing 100 according to this embodiment, for example, in a component manufacturer, the ASSY process in which the clipping member 200 is fitted onto the sealing member 120 is carried out. The ASSY product is carried to, for example, the assembly process in an automobile manufacturer. In this case, formation of the first and second projecting inner walls 122 and 123 in the sealing member 120 inhibits the clipping member 200 from dropping off from the sealing member 120 during carriage.

In the assembly process, while the clipping member 200 is elastically deformed, the slit portion 102 is opened to allow passage of the stabilizer bar up to the holding hole 101, so as to externally fit the stabilizer bushing 100 to the stabilizer bar. Subsequently, while the outer peripheral surface of the stabilizer bushing 100 is held, the bracket metal fitting (not illustrated) is mounted on the vehicle body. Accordingly, the stabilizer bar (not illustrated) is elastically supported on the vehicle body via the stabilizer bushing 100.

As just described, in the ASSY process (for example, in a component manufacturer), also when the clipping member 200 is fitted onto the sealing member 120 in advance, the clipping member 200 with the opening portion (that is, formed approximately in the C shape) allows externally fitting the stabilizer bushing 100 to the stabilizer bar in the assembly process (for example, in an automobile manufacturer). Accordingly, in the assembly process, it is not necessary to carry out the work for externally fitting the clipping member 200 to the sealing member 120 so as to improve the work efficiency. That is, the marketability of the stabilizer bushing 100 can be enhanced.

In this case, the positioning portion 124, which engages with the opening portion of the clipping member 200, is formed in the externally-fitted depressed groove 121 of the sealing member 120 so as to match the phases of the slit portion 102 of the sealing member 120 and the opening portion of the clipping member 200. Accordingly, in the assembly process, when the slit portion 102 is opened to externally fit the stabilizer bushing 100 to the stabilizer bar (not illustrated), it is not necessary to match the position of the opening portion of the clipping member 200 to the slit portion 102. Thus, the work efficiency can be correspondingly improved.

Here, in the usage state mounted on the vehicle, engagement of the positioning portion 124 with the opening portion of the clipping member 200 restricts rotation of the clipping member 200 in the circumferential direction. That is, the circumferential position of the opening portion of the clipping member 200 can be maintained in the position where the force in the twisting direction from the stabilizer bar (not illustrated) is less likely to act. This inhibits the clipping member 200 from dropping off from the sealing member 120 after the opening portion of the clipping member 200 is opened by the force in the twisting direction acting from the stabilizer bar.

As described above, with the stabilizer bushing 100 according to this embodiment, the tightening margin for elastic fitting is provided to the sealing member 120 by the fastening force of the clipping member 200 fitted onto the outer peripheral surface of the sealing member 120. As a result, the inner peripheral surface of the sealing member 120 has close contact with the outer peripheral surface of the stabilizer bar (not illustrated). This inhibits the foreign material from getting into between the outer peripheral surface of the stabilizer bar and the inner peripheral surface of the main body member 110.

In this case, the clipping member 200 is formed approximately in a C shape that has an inner diameter smaller than the outer diameter of the sealing member 120 and has an opening portion. Accordingly, in the case where a permanent set occurs in the rubber elastic body (the sealing member 120) as time passes, the clipping member 200 can be reduced in diameter by its own elastic restoring force. As a result, the tightening margin for elastic fitting to the stabilizer bar can be continuously provided to the sealing member 120.

Figure 5:
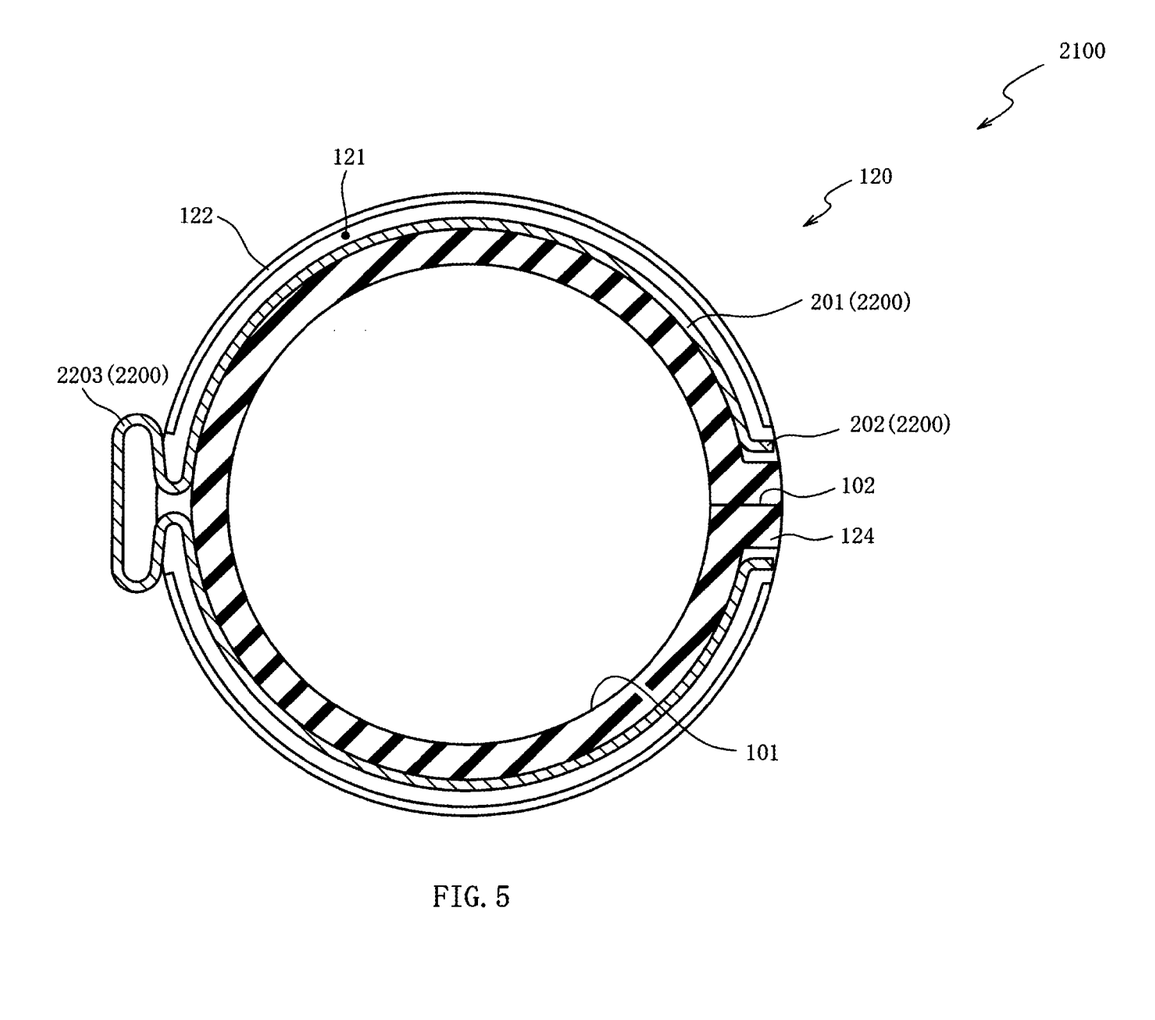
FIG. 5 is a partially enlarged cross-sectional view of the stabilizer bushing according to a second embodiment.

Next, a description will be given of a stabilizer bushing 2100 according to a second embodiment referring to FIG. 5. FIG. 5 is a partially enlarged cross-sectional view of the stabilizer bushing 2100 according to the second embodiment, and corresponds to a cross-sectional view taken along the line III-III in FIG. 1(a). Like reference numerals designate corresponding or identical elements in the first embodiment and the second embodiment, and therefore such elements will not be further elaborated here.

As illustrated in FIG. 5, a clipping member 2200 according to the second embodiment further includes an auxiliary portion 2203. For details, in the clipping member 2200, the portion differing from the opening portion of the wound portion 201 in phase by 180 degrees is separated, and the separated portion of the wound portion 201 couples to the auxiliary portion 2203. The auxiliary portion 2203 is formed approximately in a ring shape having a vertically long oval shape in a view of the axial direction, and is arranged at the radially outer side (the left side in FIG. 5) of the wound portion 201.

Here, the width dimension (the vertical dimension on the paper in FIG. 5) of the auxiliary portion 2203 is set to the dimension identical to the width dimensions of the wound portion 201 and the folded-back portion 202. In the second embodiment, the formation of the second projecting inner wall 123 is omitted.

Accordingly, with the stabilizer bushing 2100 according to the second embodiment, when the opening portion of the clipping member 2200 is opened to externally fit the clipping member 2200 to the sealing member 120, or when the slit portion 102 is opened to allow passage of the stabilizer bar (not illustrated) up to the holding hole 101, the auxiliary portion 2203 allows facilitating deformation of the clipping member 2200.

This facilitates the work for opening the opening portion (the slit portion 102) of the clipping member 2200, thus improving the work efficiency when the clipping member 2200 is fitted onto the sealing member 120 or the work efficiency when the stabilizer bushing 2100 is fitted onto the stabilizer bar.

As just described, since the auxiliary portion 2203 is formed in the position differing from the slit portion 102 in phase by 180 degrees, the deformation of the clipping member 2200 is less likely to reach the plastic region even in the case where, for example, the opening portion of the clipping member 2200 is excessively opened due to the work failure of the worker or similar cause. This correspondingly reduces the situation where the specified fastening force cannot be provided.

Figure 6A:
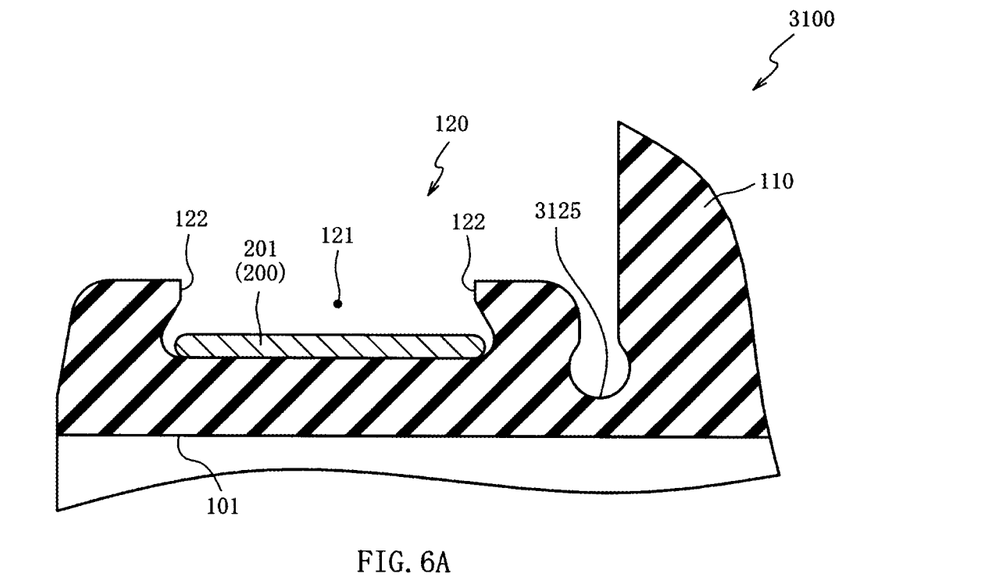
FIG. 6(a) is a partially enlarged cross-sectional view of the stabilizer bushing according to a third embodiment.

Next, a description will be given of a stabilizer bushing 3100 according to a third embodiment referring to FIG. 6(a). FIG. 6(a) is a partially enlarged cross-sectional view of the stabilizer bushing 3100 according to the third embodiment, and corresponds to a cross-sectional view taken along the line IVa-IVa in FIG. 3. Like reference numerals designate corresponding or identical elements in the respective embodiments, and therefore such elements will not be further elaborated here.

As illustrated in FIG. 6(a), a communication-portion depressed groove 3125 according to the third embodiment is formed to have a circular shape in cross-sectional view at a groove bottom side (the lower side in FIG. 6(a)) and the groove width (the dimension in the right-left direction in FIG. 6) is expanded. This easily provides the effect that makes the sealing member 120 independent from the main body member 110 (that is, the sealing member 120 can become less likely to be affected by the main body member 110) such that the sealing member 120 can easily follow the movement of the stabilizer bar (not illustrated). At the same time, the stress concentration can be reduced by the stress relaxation effect so as to reduce the occurrence of crack at the groove bottom side of the communication-portion depressed groove 3125.

Figure 6B:
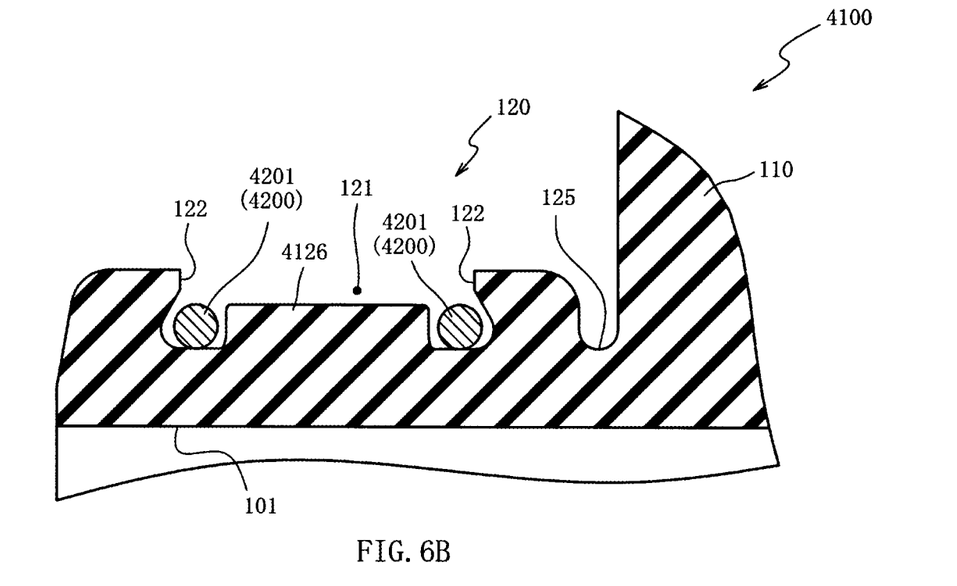
FIG. 6(b) is a partially enlarged cross-sectional view of the stabilizer bushing according to a fourth embodiment.

Next, a description will be given of a stabilizer bushing 4100 according to a fourth embodiment referring to FIG. 6(b). FIG. 6(b) is a partially enlarged cross-sectional view of the stabilizer bushing 4100 according to the fourth embodiment, and corresponds to a cross-sectional view taken along the line IVa-IVa in FIG. 3. Like reference numerals designate corresponding or identical elements in the respective embodiments, and therefore such elements will not be further elaborated here.

As illustrated in FIG. 6(b), a clipping member 4200 according to the fourth embodiment is formed from a metallic material, and is formed approximately in a C shape by rolling a linear body having a circular shape in cross-sectional view along the longitudinal direction of the linear body into a ring shape and by separating a part of the ring shaped in the circumferential direction so as to form an opening portion. That is, the clipping member 4200 according to the fourth embodiment differently has a different cross-sectional shape, and is otherwise similar to the clipping member 4200 according to the first embodiment.

Accordingly, the clipping member 4200 includes a wound portion 4201 and a folded-back portion (not illustrated). The wound portion 4201 is formed to have a part excluding an opening portion in a circular shape in a view of the axial direction (the right-left direction in FIG. 6(b)), and the inner diameter dimension is set to be a dimension (small diameter) smaller than the outer diameter dimension of the sealing member 120 in the bottom wall of the externally-fitted depressed groove 121. Accordingly, the clipping member 4200 (the wound portion 4201) can be fitted onto the outer peripheral surface of the sealing member 120 (the bottom wall of the externally-fitted depressed groove 121) to provide the fastening force to the sealing member 120, so as to elastically fit the inner peripheral surface of the sealing member 120 to the outer peripheral surface of the stabilizer bar (not illustrated) (in close contact by a predetermined tightening margin).

As just described, in this embodiment, since the clipping member 4200 is formed from the linear body having the circular shape in cross-sectional view, the sealing member 120 can easily follow the movement of the stabilizer bar (not illustrated) only in the constraint region where the sealing member 120 is constrained by the clipping member 4200. Accordingly, also in the case where the force from the stabilizer bar in the twisting direction acts, the clearance is less likely to be formed between the inner peripheral surface of the sealing member 120 and the outer peripheral surface of the stabilizer bar. As a result, this reduces the entrance of the foreign material.

In the externally-fitted depressed groove 121, two of the clipping members 4200 are arranged at a predetermined distance from each other in the axial direction (the right-left direction in FIG. 6(b)). This ensures the compatibility between: the effect that easily causes the sealing member 120 to follow the movement of the stabilizer bar (not illustrated); and the effect that reduces the entrance of the foreign material.

In this case, the externally-fitted depressed groove 121 includes a protruding portion 4126 that is disposed to protrude toward the radially outer side (the upward direction in FIG. 6(b)) from the bottom wall of the protruding portion 4126 and intervenes between the two clipping members 4200 continuously formed in the circumferential direction. Similarly to the case of the inner wall of the externally-fitted depressed groove 121 described above, when the clipping member 4200 is externally fitted, the sidewall of the protruding portion 4126 can fall inward (be interfolded) by the fastening force of the clipping member 4200. This restricts not only the displacement of the clipping member 4200 in the axial direction (the right-left direction in FIG. 6(b)) but also the displacement of the clipping member 4200 in the radial direction (the upper direction in FIG. 6(b)). This consequently inhibits the clipping member 4200 from dropping off.

As described above, the present invention has been described based on the above-mentioned embodiments. It will be appreciated that the present invention will not be limited to the embodiments described above, but various modifications are possible without departing from the technical scope of the present invention.

In the above-described respective embodiments, the description is given of the case where the clipping members 200 and 2200 are formed in the horizontally long rectangular shape in cross-sectional view. This should not be necessarily construed in a limiting sense, and another shape is possible. As the other cross-sectional shape, for example, a circular shape, an elliptical shape, or a multangular shape can be employed as an example.

In the above-described respective embodiments, while the description is omitted, on the inner peripheral surface of the holding hole 101, Teflon (registered trademark) fiber may be arranged or coating may be performed to ensure lubricity.

In this case, the holding hole 101 formed in the main body member 110 and the holding hole 101 formed in the sealing member 120 may have mutually different friction properties in their respective inner peripheral surfaces. For example, providing a lower friction property (or a higher friction property) of one inner peripheral surface than that of the other inner peripheral surface allows the sealing member to easily follow the movement of the stabilizer bar (not illustrated). This inhibits the clearance from being formed between the inner peripheral surface of the sealing member 120 and the outer peripheral surface of the stabilizer bar in the case where the force in the twisting direction from the stabilizer bar acts.

In the above-described respective embodiments, the description is given of the case where the respective protruding portions (the first projecting inner wall 122 and the second projecting inner wall 123) with the different projecting amounts are disposed on the inner wall of the externally-fitted depressed groove 121. This should not be necessarily construed in a limiting sense. For example, only any one of the first projecting inner wall 122 and the second projecting inner wall 123 may be disposed in the whole circumference excluding the positioning portion 124.

In the above-described respective embodiments, the description is given of the case where the sealing member 120 is disposed in communication with only one axial end surface of the main body member 110. This should not be necessarily construed in a limiting sense. The sealing member 120 may be disposed in communication with both the axial end surfaces of the main body member 110.

In the above-described respective embodiments, in the assembly process, the description is given of the case where the stabilizer bushings in the state where the clipping members 200 and 2200 are fitted onto the sealing member 120 are mounted on the stabilizer bar. This should not be necessarily construed in a limiting sense. The main body member 110 and the sealing member 120 may be mounted on the stabilizer bar in advance and then the clipping members 200 and 2200 may be fitted onto the sealing member 120.

In the above-described respective embodiments, the description is given of the case where the communication-portion depressed groove 125 is formed in the constant cross-sectional shape along the circumferential direction. This should not be necessarily construed in a limiting sense. The cross-sectional shape may be different corresponding to the circumferential position.

For example, as an example of the configuration, the cross-sectional area of the cross-sectional shape of the communication-portion depressed groove 125 positioned in the up-down direction (the direction in which the force in the twisting direction from the stabilizer bar acts) is set to be larger than the cross-sectional area of the cross-sectional shape of the communication-portion depressed groove 125 positioned in the direction perpendicular to the up-down direction. Specifically, any one or both of the width dimension and the depth dimension of the communication-portion depressed groove 125 are increased.

This easily causes the sealing member to follow the movement of the stabilizer bar (not illustrated) so as to inhibit the clearance from being formed between the inner peripheral surface of the sealing member 120 and the outer peripheral surface of the stabilizer bar in the case where the force in the twisting direction from the stabilizer bar acts.

In the above-described respective embodiments, the description is given of the case where one inner wall of the communication-portion depressed groove 125 flatly continues into the axial end surface of the main body member 110. This should not be necessarily construed in a limiting sense. The communication-portion depressed groove 125 may be formed in the position at a distance from the axial end surface of the main body member 110.

In the above-described second embodiment, the description is given of the case where the auxiliary portion 2203 of the clipping member 2200 is formed approximately in the ring shape having the vertically long oval shape in a view of the axial direction. This should not be necessarily construed in a limiting sense, and another shape is possible. As the other shape, for example, a circular shape, a laterally long oval shape, an elliptical shape, or similar shape maybe employed as an example.

In the above-described second embodiment, the description is given of the case where the formation of the second projecting inner wall 123 is omitted. This should not be necessarily construed in a limiting sense. The second projecting inner wall 123 may be formed and this second projecting inner wall 123 may be inserted through (engage with) the auxiliary portion 2203 of the clipping member 2200. This more reliably inhibits the clipping member 2200 from dropping off from the sealing member 120.

In the above-described fourth embodiment, the description is given of the case where the count of arrangements of the clipping members 4200 is two. This should not be necessarily construed in a limiting sense. The count of arrangements may be one or may be three or more. In the case of three or more, the respective protruding portions 4126 are preferred to be arranged between the respective clipping members 4200.

In the above-described fourth embodiment, the description is given of the case where the height dimension (the protruding height of the externally-fitted depressed groove 121 from the bottom wall) of the protruding portion 4126 is set to be approximately identical to the diameter of the clipping member 4200. This should not be necessarily construed in a limiting sense. The height dimension of the protruding portion 4126 can be set to any dimension. For example, the height dimension of the protruding portion 4126 may be the dimension identical to the depth dimension (the depression depth of the sealing member 120 with respect to the outer peripheral surface) of the externally-fitted depressed groove 121.

In the above-described fourth embodiment, the description is given of the case where the sidewall of the protruding portion 4126 is formed as the flat surface. This should not be necessarily construed in a limiting sense. Similarly to the inner wall of the externally-fitted depressed groove 121, the first projecting inner wall 122 or (and) the second projecting inner wall 123 may be formed on the sidewall of the protruding portion 4126.

In the above-described fourth embodiment, the description is given of the case where the protruding portion 4126 is continuously formed in the circumferential direction. This should not be necessarily construed in a limiting sense. The protruding portion 4126 may be intermittently formed in the circumferential direction.

In the above-described fourth embodiment, the description is given of the case where the clipping member 4200 is formed to include the wound portion 4201 and the folded-back portion. This should not be necessarily construed in a limiting sense. The portion in the shape similar to that of the auxiliary portion 2203 according to the second embodiment may be further included in the position differing from the opening portion in phase by 180 degrees.

The invention claimed is:

1. A stabilizer bushing that is formed in a tubular shape from a rubber elastic body and fitted onto a stabilizer bar, the stabilizer bushing comprising:
   a main body member whose outer peripheral surface is held by a mounting member to be mounted at a vehicle body side; and
   a sealing member that is integrally disposed in communication with an axial end surface of the main body member and elastically fitted to an outer peripheral surface of the stabilizer bar,
   wherein the stabilizer bushing includes a clipping member fitted onto an outer peripheral surface of the sealing member to provide a fastening force to the sealing member, the fastening force being for elastically fitting the sealing member to the outer peripheral surface of the stabilizer bar, wherein the clipping member includes an opening portion formed to have a partial separation in a circumferential direction and is formed from a metallic material approximately in a C shape having an inner diameter smaller than an outer diameter of the sealing member, wherein the sealing member includes an externally-fitted depressed groove that is depressed on the outer peripheral surface of the sealing member and disposed to extend along a circumferential direction, and the clipping member is fitted onto the externally-fitted depressed groove, wherein the main body member and the sealing member include a slit portion formed to have a partial separation in a circumferential direction in the tubular shape, and wherein the externally-fitted depressed groove of the sealing member includes a positioning portion formed to be engageable with the opening portion of the clipping member, the positioning portion positioning the opening portion of the clipping member in a position having a phase identical to a phase of the slit portion of the sealing member.

2. The stabilizer bushing according to claim 1, wherein the sealing member includes a communication-portion depressed groove that is depressed on an outer peripheral surface of a communication portion with the main body member and is disposed to extend in a circumferential direction.

3. The stabilizer bushing according to claim 2, wherein the communication-portion depressed groove is formed to have a circular shape in cross-sectional view at a groove bottom side so as to have an expanded groove width.

4. The stabilizer bushing according to claim 1, wherein the externally-fitted depressed groove of the sealing member is formed such that at least a part of an inner wall of the externally-fitted depressed groove projects inward.

5. The stabilizer bushing according to claim 4, wherein a projection distal end projects inward from the inner wall of the externally-fitted depressed groove, and the projection distal end has an overlap margin with the clipping member in a state where the fastening force of the clipping member does not act.

6. The stabilizer bushing according to claim 1, wherein the inner wall of the externally-fitted depressed groove of the sealing member includes a projecting inner wall formed such that a predetermined range having a position differing from the slit portion in phase by 180 degrees partially projects inward.

7. The stabilizer bushing according to claim 1, wherein the clipping member includes a pair of folded-back portions formed such that the opening portion is folded back toward a radially outer side, and the positioning portion is disposed to protrude toward a radially outer side from a bottom surface of the externally-fitted depressed groove and is set to have a dimension smaller than a facing distance between the folded-back portions.

8. The stabilizer bushing according to claim 7, wherein a clearance is formed in a portion where the positioning portion and the folded-back portion of the clipping member face one another.

9. The stabilizer bushing according to claim 1, wherein the clipping member is formed from a flat plate body that has a horizontally long rectangular shape in cross-sectional view.

10. The stabilizer bushing according to claim 1, wherein the clipping member is formed from a linear body that has a circular shape in cross-sectional view.

11. The stabilizer bushing according to claim 10, wherein a plurality of the clipping members are separated from one another by a predetermined distance in an axial direction of the sealing member and are fitted onto the outer peripheral surface of the sealing member.

12. The stabilizer bushing according to claim 11, wherein the sealing member includes a protruding portion that is disposed to protrude toward a radially outer side from the outer peripheral surface of the sealing member and intervenes between a plurality of the clipping members.

13. The stabilizer bushing according to claim 12, wherein the protruding portion is formed such that at least a part of a sidewall of the protruding portion projects outward.

14. The stabilizer bushing according to claim 1, wherein the clipping member includes:
a wound portion that includes the opening portion and is fitted onto the outer peripheral surface of the sealing member, the wound portion having a separated portion differing from the opening portion in phase by 180 degrees; and
an auxiliary portion extended from the separated portion of the wound portion toward a radially outer side of the wound portion, the auxiliary portion being formed approximately in a ring shape.

* * * * *